United States Patent [19]
Guzzoni

[11] Patent Number: 5,938,245
[45] Date of Patent: Aug. 17, 1999

[54] JOINT FOR CONNECTING DUCTS FOR FLUID DISTRIBUTION SYSTEMS

[75] Inventor: Gianfranco Guzzoni, Via Fontanelli, Italy

[73] Assignee: Teseo S.r.l., Brescia, Italy

[21] Appl. No.: 08/950,003

[22] Filed: Oct. 14, 1997

[51] Int. Cl.[6] .................................................. F16L 37/08
[52] U.S. Cl. ............................................ 285/305; 285/420
[58] Field of Search ..................................... 285/305, 420

[56] References Cited

U.S. PATENT DOCUMENTS

| | | | |
|---|---|---|---|
| 3,282,612 | 11/1966 | Younger | 285/305 X |
| 3,560,027 | 2/1971 | Graham | 285/305 X |
| 4,526,411 | 7/1985 | Bartholomew | 285/305 |
| 5,092,300 | 3/1992 | Imoehi et al. | 285/305 X |
| 5,769,460 | 6/1998 | Imai | 285/305 X |

*Primary Examiner*—Dave W. Arola
*Attorney, Agent, or Firm*—McGlew and Tuttle, P.C.

[57] ABSTRACT

A joint for connecting ducts for fluid distribution systems under pressure or under vacuum. The joint element has, on its periphery, a collar (18) having a diameter that is greater than the external diameter of the joint body (15), and which forms a support surface (19), with its foremost frontal-radial face, against the head of the hollow bar, and with its opposite frontal-radial face, a shoulder (20), which interacts with one or more locking brackets (21) to be fixed to the hollow bar.

13 Claims, 2 Drawing Sheets

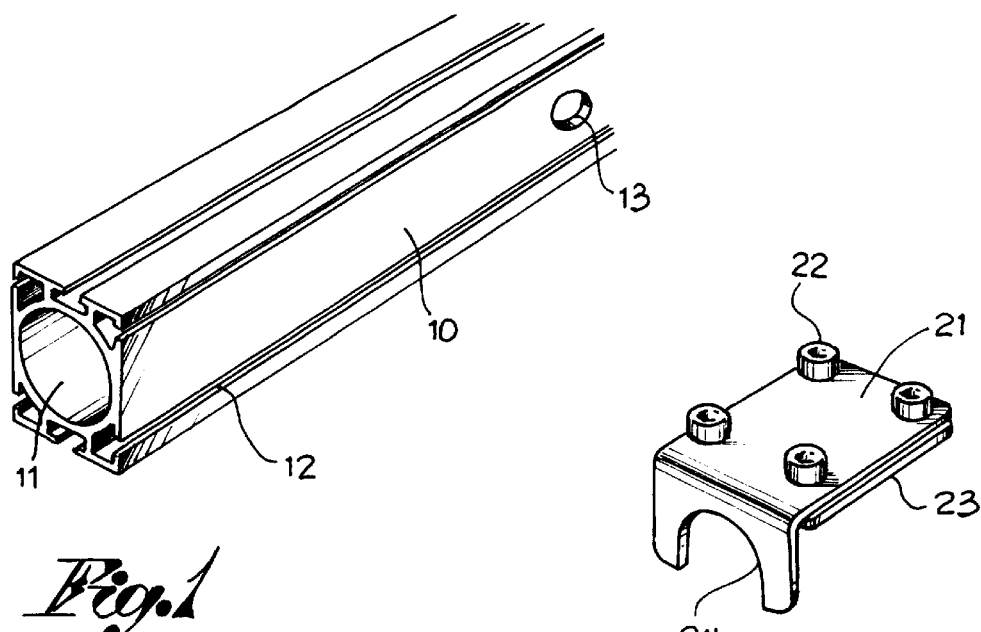
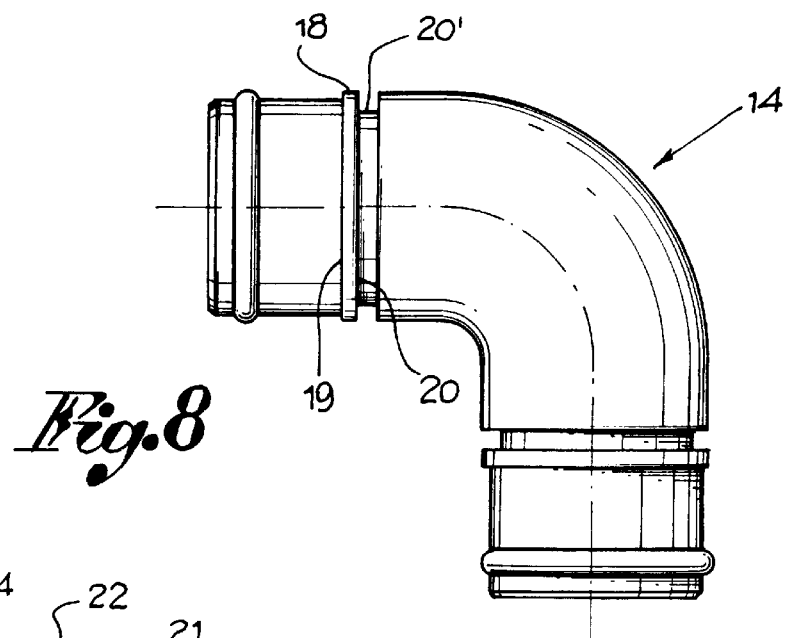
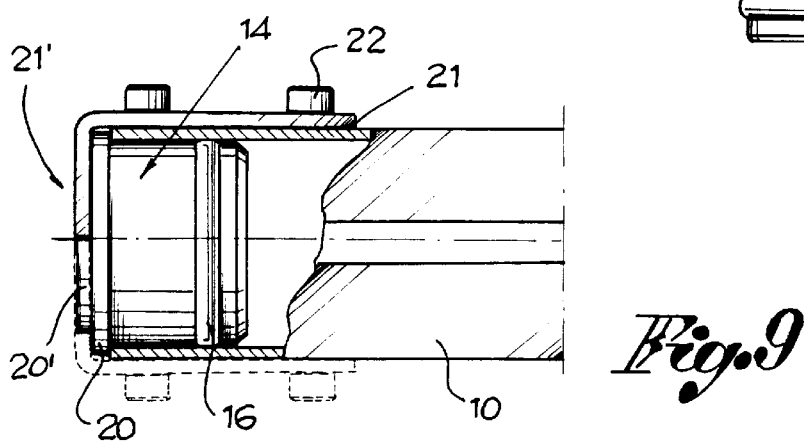

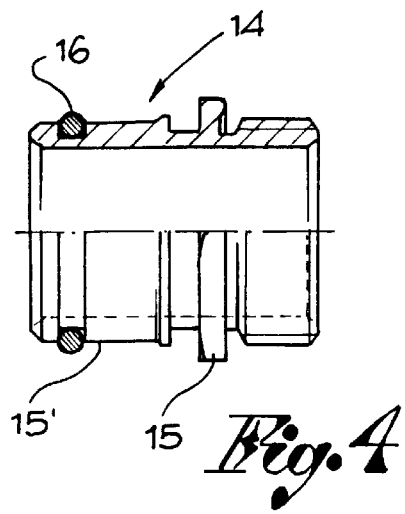
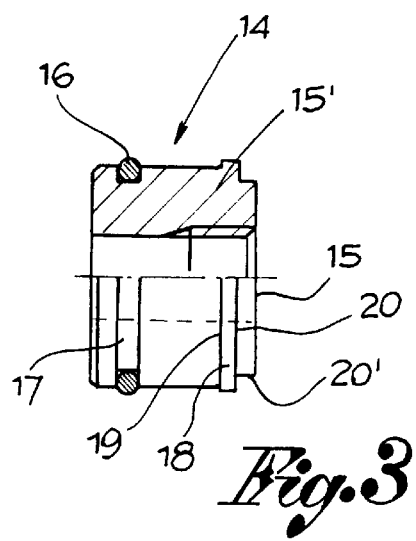
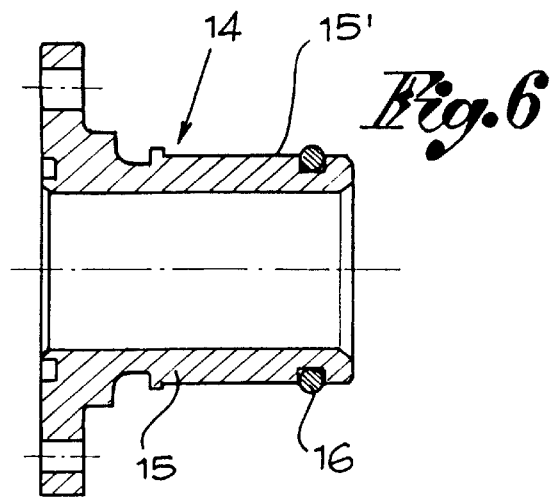
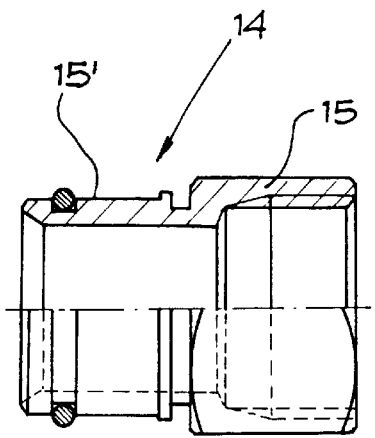
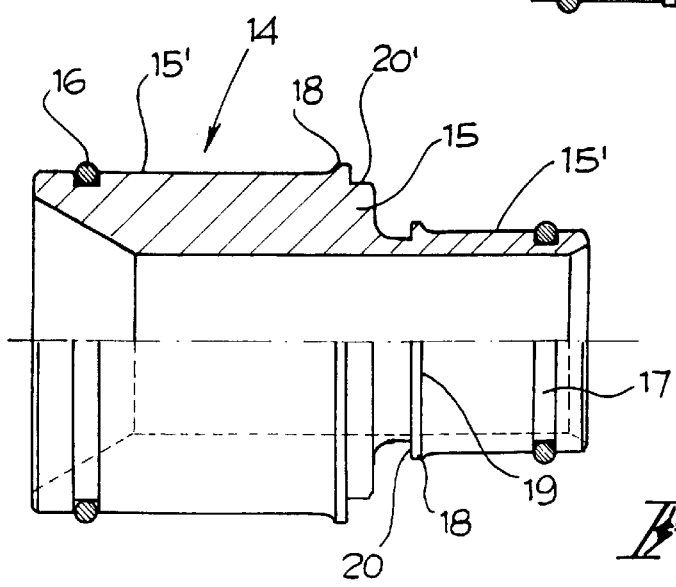

JOINT FOR CONNECTING DUCTS FOR FLUID DISTRIBUTION SYSTEMS

FIELD OF THE INVENTION

The present invention pertains, in general, to systems for the circulation and the distribution of fluids, such as compressed air or air under vacuum, and liquids, and pertains, in particular, to a joint for connecting, in a line or at an angle, hollow bars used as ducts for such fluids.

BACKGROUND OF THE INVENTION

The use of hollow bars to channel and distribute a gaseous fluid or liquid has already become known, since it was proposed by the same applicant. Each bar for this use is advantageously composed of an extruded section made of aluminum, of quadrilateral section, having a central longitudinal hole and, on the sides, channel-like grooves, which are also longitudinal and open towards the outside. Such a bar is connected modularly with other bars of the same type, in a line or at an angle, by means of tubular joints, essentially of round section, and with the use of removable connecting plates or brackets.

Each tubular joint, which may be straight, at an angle, T-shaped or cross-shaped, has one or more branches, which are inserted into the hole of the bars to be connected and which have at least one packing for a fluid seal in the fit between the joint and the inner surface of the hole.

The connecting plates or brackets are then fixed by means of screws to the slide blocks inserted into the channel-like grooves of the bars to be joined and are used to keep the bars joined to one another and to the joint.

However, such a way of connecting the duct bars is not without drawbacks. Each joint, though having at least one seal packing, which is inserted by force into the hole of a bar, is not effectively anchored to the bar itself, but can be moved in relation to this bar, either towards the outside, or towards the inside, because of the force of the fluid distributed. Thus, the safety of the system is diminished, especially at the level of the end joints, when they are blind and used as plugs for closing the hole of a bar.

On the other hand, the connecting plates or brackets join the ends of the bars without directly engaging the joints, and if they are shaped to be engaged with these joints, the assembly becomes complicated as the bracket and joint must be mounted together.

SUMMARY AND OBJECTS OF THE INVENTION

The object of the present invention is to eliminate the above-mentioned drawbacks and disadvantages of the prior art and to improve the quality and the safety of the fluid duct and distribution systems using hollow bars in the form of sections made of aluminum.

This object is accomplished, while maintaining the structure of the hollow duct bars, with a connecting joint having a body with a tubular section with at least one branch provided with at least one packing and intended to be inserted into the longitudinal hole of a bar. The joint is characterized in that it has, on the periphery, a collar having a diameter, which is greater than the external diameter of the tubular joint body, and in that it forms a support surface, with its foremost frontal-radial face, against the head of the hollow bar, around the hole of this bar, and with its opposite frontal-radial face, a shoulder, which interacts with a locking bracket to be fixed to the hollow bar and has a portion which is mounted on the joint body close to the shoulder.

On the side of said frontal-radial shoulder, the joint body is preferably provided with a circular groove or step, which increases the area of the surface of this shoulder.

Therefore, the support of the collar on the periphery against the head of a respective duct bar always makes possible a correct positioning of the joint and prevents any complete, accidental or undesired entrance of the joint itself in the hole of the bar. On the other hand, the interaction of the said locking bracket with the shoulder defined by the said collar ensures the support of the collar against the head of the bar and, at the same time, the unthreading of the joint. The increased surface of this shoulder thanks to the groove or step made around the joint body guarantees the locking of the joint by the bracket as well even in the presence of operating pressures that are higher than those expected and those that can be reached.

In summary, the peripheral collar of the joint body offers at least the following advantages:

- the impossibility of the tubular joint of completely entering the hollow bar to which it is attached;
- a better anchoring of the joint by the locking bracket;
- a high resistance against the force of the fluid on the joint, which tends to discharge it from the hole of the hollow bar;
- the possibility of using the joint with a high degree of reliability in systems either for fluids under pressure or for fluids under vacuum or suction, thanks to its support and axial bidirectional locking;
- a great ease of assembly since the locking bracket may be attached to the hollow bar separately from the joint as well, after this has been arranged in the hole of the bar.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 is a perspective view of a piece of hollow bar with a lateral fluid outlet hole;

FIG. 2 is a perspective view of a locking bracket;

FIG. 3 is a partially sectional view of a linear tubular joint;

FIGS. 4–8 are partially sectional top views or top views showing the same number of different shapes of tubular joints; and FIG. 9 is an example of connecting a joint with a hollow bar to a locking bracket.

DESCRIPTION OF THE PREFERRED EMBODIMENT

Referring to the drawings in particular, a hollow bar 10 for a duct system of a fluid to be distributed is shown in FIG. 1. The bar consists of a section of quadrilateral section, extruded in aluminum, having a central longitudinal hole 11 and, on the sides, channel-like grooves 12, which are also longitudinal and open towards the outside. Lateral holes 13 may be made on the sides of the bar for the outlet of the fluid to be used. The bar shaped in this manner may be cut to any length and be provided with at least one end joint 14 for connecting consecutive, contiguous bars or other components, or simply for an end closing of their duct.

Each joint 14 has a body 15, which has essentially a tubular shape and a circular section, with at least one branch 15' intended to be inserted into the hole 11 of the hollow bar 10 with the interposition of at least one seal packing 16 under pressure 16. The branch 15' of the joint body has at least one peripheral groove 17 for the seal packing 16 and one peripheral collar 18 having a diameter that is greater than the external diameter of the joint body corresponding to the branch 15'.

The peripheral collar 18 has a foremost frontal-radial face, which turns towards the seal packing 16, which defines a support surface 19 that is intended for abutting against the head of the hollow bar, to which the joint is attached. The opposite frontal-radial face of the collar 18 defines a shoulder 20, with which at least one bracket 21 provided for the axial locking of the joint to the hollow bar may interact.

On the body 15 of the joint, adjacent to the shoulder 20, a step or circular groove 20' is preferably provided to increase the area of the surface of this shoulder compared with that of the support surface 19 on the other side of the collar 18.

The connecting bracket 21 is in the form of a plate and is fixed, by means of screws 22, to the blocks 23 inserted into the longitudinal grooves 12 of the hollow bar. The bracket 21 also has an angular fixing portion 21' that is intended to be mounted on the joint or for enclosing this joint corresponding to the step or groove 20' and for supporting against the shoulder 20 so as to lock the joint when the bracket is fixed to the bar.

All this is to attain the objects and with the advantages mentioned above.

It should be noted that depending on the needs, the joint may be straight, elbow-shaped, T-shaped or cross-shaped and may be in the form of a sleeve (FIG. 3); of a sleeve having an external threaded section (male nipple) (FIG. 4); of a sleeve with an internal hexagon (FIG. 5); a flanged sleeve (FIG. 6); a sleeve having two external diameters (reducer joint) (FIG. 7) or even another, each having at least one packing and having a peripheral collar for the functions referred to above.

While specific embodiments of the invention have been shown and described in detail to illustrate the application of the principles of the invention, it will be understood that the invention may be embodied otherwise without departing from such principles.

What is claimed is:

1. A joint for connecting ducts for systems for distributing fluids under pressure or under vacuum, comprising:

a duct made from an extruded aluminum hollow bar which has a quadrilateral section, a central longitudinal hole and a head surface around said hole, and, on sides, channel-like grooves that are longitudinal and open towards an outside;

a locking bracket with fixing means for fixing said locking bracket to said hollow bar, said locking bracket including an angular portion; and a connecting joint element with a joint body of tubular section with at least one branch which is provided with at least one seal packing insertable into said hole of said hollow bar, said connecting joint element having a periphery with a collar with a diameter that is greater than an external diameter of said joint body and said hole and having a foremost frontal-radial face which forms a support surface against said head surface, and with an opposite frontal-radial face which forms a shoulder against and enclosed by said angular portion of said locking bracket.

2. The connecting joint in accordance with claim 1, wherein said joint body, adjacent to said shoulder, has one of a step and a circular groove made such that the area radial height of said shoulder is greater than a the area of said support surface, and said angular portion of said locking bracket engages said body at said one of said step and said circular groove.

3. The connecting joint in accordance with claim 2, wherein said joint body is straight, elbow-shaped, T-shaped or cross-shaped.

4. Connecting joint in accordance with claim 2, wherein said fixing means of said locking bracket is in a form of a plate fixed by means of screws to two blocks that are inserted in two of said grooves on sides of said hollow bar.

5. The connecting joint in accordance with claim 1, wherein said joint body is straight, elbow-shaped, T-shaped or cross-shaped.

6. The connecting joint in accordance with claim 1, wherein said joint body is in the form of a sleeve.

7. The connecting joint in accordance with claim 6, wherein said joint body in the form of a sleeve with one of a threaded part, a non-threaded part, an internal polygonal shape, and an external polygonal shape.

8. The connecting joint in accordance with claim 6, wherein said joint body in the form of a sleeve with one of a flanged sleeve, and a reducer sleeve with two external diameters.

9. Connecting joint in accordance with claim 1, wherein said fixing means of said locking bracket is in a form of a plate fixed by means of screws to two blocks that are inserted in two of said grooves on sides of said hollow bar.

10. A duct arrangement comprising:

a duct made from a hollow bar defining a central longitudinal hole and a head surface around said hole, said hollow bar also defining a longitudinal channel-like groove on sides of said hollow bar, said channel like groove having a radial opening;

a connecting joint element with a branch and a seal on said branch, said branch and said seal being insertable into said hole of said hollow bar, said connecting joint element having a collar with a diameter greater than an internal diameter of said hole of said hollow bar, said collar including a first radial face positionable against said head surface, said collar including a second radial face diametrically opposite said first radial face;

a locking bracket including fixing means for fixing said locking bracket to said duct, said locking bracket having a fixing portion positionable against said second radial face to fix said connecting joint element to said duct.

11. The arrangement in accordance with claim 10, wherein:

said fixing portion of said locking bracket encloses a portion of said joint element and is positionable against said second radial face;

said branch is a tubular section;

said head surface is radial and at an end of said duct.

12. The arrangement in accordance with claim 10, wherein:

said locking bracket includes a plate;

said fixing means including a block insertable into said groove of said duct, said fixing means includes fastening means for fastening said plate of said locking bracket to said block.

13. The arrangement in accordance with claim 12, wherein:

said plate is angularly spaced from said fixing portion; said fastening means includes screws.

* * * * *